United States Patent
Nagano et al.

(10) Patent No.: US 9,728,157 B2
(45) Date of Patent: Aug. 8, 2017

(54) PROGRAM, DISPLAY APPARATUS, TELEVISION RECEIVER, DISPLAY METHOD, AND DISPLAY SYSTEM

(71) Applicant: SHARP KABUSHIKI KAISHA, Osaka-shi, Osaka (JP)

(72) Inventors: Tomohiro Nagano, Osaka (JP); Tsutomu Takahashi, Osaka (JP); Atsushi Ohnuma, Osaka (JP); Kenichi Kimura, Osaka (JP); Hiroyuki Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 43 days.

(21) Appl. No.: 14/431,254

(22) PCT Filed: May 31, 2013

(86) PCT No.: PCT/JP2013/065129
§ 371 (c)(1),
(2) Date: Mar. 25, 2015

(87) PCT Pub. No.: WO2014/050211
PCT Pub. Date: Apr. 3, 2014

(65) Prior Publication Data
US 2015/0248870 A1 Sep. 3, 2015

(30) Foreign Application Priority Data

Sep. 27, 2012 (JP) ................................ 2012-215276
Sep. 27, 2012 (JP) ................................ 2012-215277
Sep. 27, 2012 (JP) ................................ 2012-215278

(51) Int. Cl.
*G09G 5/00* (2006.01)
*G09G 5/14* (2006.01)
(Continued)

(52) U.S. Cl.
CPC ............... *G09G 5/005* (2013.01); *G06T 1/20* (2013.01); *G06T 3/40* (2013.01); *G09G 5/14* (2013.01);
(Continued)

(58) Field of Classification Search
None
See application file for complete search history.

(56) References Cited

U.S. PATENT DOCUMENTS 5,467,102 A * 11/1995 Kuno .................... G06F 1/1618
345/1.3
6,593,928 B1 * 7/2003 Chang .................... G09G 5/363
345/501
(Continued)

FOREIGN PATENT DOCUMENTS

| CN | 1669306 A | 9/2005 |
|---|---|---|
| CN | 1685714 A | 10/2005 |
| JP | 2005-20743 A | 1/2005 |
| JP | 2012-48027 A | 3/2012 |

*Primary Examiner* — M Good Johnson
(74) *Attorney, Agent, or Firm* — Birch, Stewart, Kolasch & Birch, LLP

(57) ABSTRACT

A television receiver segments a part of an image depending on image information received from a communication device and pixel information representing the number of pixels in a longitudinal direction and a lateral direction of the image. The television receiver judges a size between the number of pixels in the longitudinal direction and that in the lateral direction in the pixel information, and when it is judged that the number of pixels in the longitudinal direction is larger than that in the lateral direction, displays two screens in which the segmented image and another image are juxtaposed on a display unit. Meanwhile, when it is judged that the number of pixels in the longitudinal direction is not larger than that in the lateral direction, the television receiver receives a signal designating the number of screens to be displayed on the display unit and displays the two
(Continued)

screens in which the segmented image and another image are juxtaposed or one screen of the segmented image on the display unit depending on the received signal.

10 Claims, 12 Drawing Sheets

(51) Int. Cl.
    *H04N 5/445* (2011.01)
    *H04N 21/431* (2011.01)
    *H04N 21/462* (2011.01)
    *G06T 1/20* (2006.01)
    *G06T 3/40* (2006.01)
    *G09G 5/377* (2006.01)
    *H04N 5/45* (2011.01)
    *G06F 3/14* (2006.01)

(52) U.S. Cl.
    CPC ......... *G09G 5/377* (2013.01); *H04N 5/44591* (2013.01); *H04N 21/4316* (2013.01); *H04N 21/4621* (2013.01); *G06F 3/1454* (2013.01); *G09G 2340/0442* (2013.01); *G09G 2340/0464* (2013.01); *G09G 2340/0492* (2013.01); *G09G 2340/14* (2013.01); *G09G 2360/06* (2013.01); *G09G 2360/16* (2013.01); *G09G 2370/16* (2013.01); *G09G 2370/20* (2013.01); *G09G 2370/22* (2013.01); *H04N 5/45* (2013.01)

(56) References Cited

U.S. PATENT DOCUMENTS

| | | | | |
|---|---|---|---|---|
| 7,046,302 | B2* | 5/2006 | Konuma | H04N 5/45 348/558 |
| 7,224,401 | B2* | 5/2007 | Ackley | H04N 7/0122 348/556 |
| 9,043,714 | B1* | 5/2015 | Queru | A63F 13/42 463/25 |
| 2003/0142872 | A1* | 7/2003 | Koyanagi | H04N 21/234327 382/236 |
| 2003/0231195 | A1* | 12/2003 | Ueno | G06T 1/20 345/698 |
| 2004/0131262 | A1* | 7/2004 | Hara | H04N 21/4621 382/232 |
| 2004/0239792 | A1 | 12/2004 | Shibutani et al. | |
| 2004/0263686 | A1 | 12/2004 | Kim | |
| 2005/0156948 | A1 | 7/2005 | Hunt | |
| 2008/0018554 | A1* | 1/2008 | Odagawa | G06F 3/1446 345/5 |
| 2012/0050290 | A1* | 3/2012 | Kobayashi | H04N 13/0404 345/426 |
| 2012/0050314 | A1* | 3/2012 | Wang | G06F 3/1446 345/619 |
| 2012/0050331 | A1 | 3/2012 | Kanda | |
| 2014/0028808 | A1* | 1/2014 | Rui | H04N 13/0402 348/51 |
| 2014/0101535 | A1* | 4/2014 | Kim | G06F 3/1431 715/234 |

* cited by examiner

PROGRAM, DISPLAY APPARATUS, TELEVISION RECEIVER, DISPLAY METHOD, AND DISPLAY SYSTEM

CROSS-REFERENCE TO RELATED APPLICATIONS

This application is the National Phase of PCT International Application No. PCT/JP2013/065129, filed on May 31, 2013, which claims priority under 35 U.S.C. 119(a) to Patent Application No. 2012-215276, filed in Japan on Sep. 27, 2012, No. 2012-215277, filed in Japan on Sep. 27, 2012 and No. 2012-215278 filed in Japan on Sep. 27, 2012, all of which are hereby expressly incorporated by reference into the present application.

FIELD

The present invention relates to a program, a display apparatus, a television receiver, a display method, and a display system, which display a screen of a portable phone, a smart phone, or the like on a display unit.

BACKGROUND

A user often wants to see an image displayed on a communication device carrying out a communications, such as a mobile phone and a smart phone, on a larger screen.

Japanese Patent Application Laid-open No. 2012-48027 discloses a display apparatus which connects a television receiver and a communication device to transmit display image data of the communication device to the television receiver, and display the display image data on a display screen of the television receiver.

SUMMARY

In the display apparatus disclosed in Japanese Patent Application Laid-open No. 2012-48027, when the communication device is connected to the television receiver, two screens of a screen of the communication device and a screen of television broadcasts are automatically displayed. Therefore, there is a problem in that when a user wants to display the image on one screen, a screen may be displayed against his/her will.

Further, in a state in which a display unit of the communication device is arranged to be laterally long, for example, when a longitudinally long screen having a fixed aspect ratio such as a photograph, a recorded video image, or the like is displayed, a region in which an image is not displayed is generated at both side portions of the screen. In the display apparatus described in Japanese Patent Application Laid-open No. 2012-48027, the television receiver displays even the region in which the image is not displayed, and thus a wasteful region may be generated on the screen displayed by the display unit.

In consideration of the above-mentioned circumstances, it is an object of the present invention to provide a program, a display apparatus, and a television receiver, which display the number of screens according to a user's will.

Another object of the present invention is to provide a program, a display apparatus, a television receiving apparatus, a display method, and a display system which are capable of effectively using a screen of a display unit.

According to one aspect of the present invention, there is provided a program for allowing a computer to execute processing for displaying a rectangular image including a plurality of pixels on a display unit, the program executed by the computer comprising the processing steps of: segmenting a part of the image from the image depending on information representing the number of pixels in one side direction of the image and the number of pixels in the other side direction orthogonal to the one side direction; judging a size between the number of pixels in the one direction and the number of pixels in the other side direction; as the judgment result, when it is judged that the number of pixels in the one side direction is larger than that in the other side direction, displaying two screens in which a segmented image and another image are juxtaposed on the display unit; and when it is judged that the number of pixels in the other side direction is larger than that in the one side direction, receiving a signal designating the number of screens to be displayed on the display unit, and displaying two screens in which the segmented image and another image are juxtaposed or one screen of the segmented image on the display unit depending on the received signal.

The program according to the present invention, which is executed by the computer, may comprise the processing steps of; when the two screens are displayed, receiving a replacement signal instructing a replacement of the screen; and replacing a display position of the segmented image and the other image depending on the received replacement signal.

According to one aspect of the present invention, there is provided a program for allowing a computer to execute processing for displaying a rectangular image including a plurality of pixels on a display unit, the program executed by the computer comprising the processing steps of: segmenting a part of the image from the image depending on information representing the number of pixels in one side direction and the number of pixels in a direction orthogonal to the one side direction; generating one image in which the segmented image is similarly enlarged; calculating a size of another image depending on a size of the one image; and displaying the one image and the other image on the display unit.

The program according to the present invention, which is executed by the computer, may comprise the processing steps of: displaying the one image and the other image by juxtaposing the same; and setting a size of the other image in a horizontal direction based on a size of the one image in the horizontal direction.

The program according to the present invention, which is executed by the computer, may comprise the processing step of: enlarging the one image so that a size of the one image in a vertical direction is equal to a length from an upper end to a lower end of the display unit.

According to another aspect of the present invention, there is provided a display apparatus displaying a rectangular image which includes a plurality of pixels and of which longitudinal and lateral directions are defined on a display unit, comprising: an image processing unit configured to segment a part of the image from the image depending on information representing the number of pixels in one side direction and the number of pixels in the other side direction orthogonal to the one side direction; a judgment unit configured to judge a size between the number of pixels in the one direction and the number of pixels in the other side direction; a receiving unit configured to receive a signal designating the number of screens to be displayed on the display unit; and a display determination unit configured to, as the judgment result of the judgment unit, when the number of pixels in the one side direction is larger than that in the other side direction, display two screens in which the image segmented by the image processing unit and another image are juxtaposed on the display unit, and when the number of pixels in the other side direction is larger than that in the one side direction, display two screens in which the image segmented by the image processing unit and another image are juxtaposed or one screen of the image segmented by the image processing unit on the display unit, depending on the signal received by the receiving unit.

According to another aspect of the present invention, there is provided a television receiver comprising: the above-described display apparatus; and a tuner which receives television broadcasts, wherein the other image which is based on the television broadcasts received by the tuner is displayed on the display unit.

According to another aspect of the present invention, there is provided a display apparatus which displays a rectangular image including a plurality of pixels on a display unit, comprising: an image processing unit configured to segment a part of the image from the image depending on information representing the number of pixels in one side direction and the number of pixels in a direction orthogonal to the one side direction; and a display determination unit configured to generate one image by similarly enlarging the image segmented by the image processing unit, calculate a size of another image depending on a size of the one image, and display the one image and the other image on the display unit.

According to another aspect of the present invention, there is provided a television receiver comprising: the above-described display apparatus; and a tuner which receives television broadcasts, wherein the display determination unit is configured to display on the display unit the other image based on the television broadcasts received by the tuner.

According to another aspect of the present invention, there is provided a display method in which a communication device generates image information representing a rectangular image including a plurality of pixels and transmits the image information, and a display apparatus connected to the communication device and including a display unit displays an image based on the received image information on the display unit, the display method being characterized in that, the communication device is configured to execute the steps of; detecting an attitude thereof; calculating pixel information representing the number of pixels in one side direction of an image based on the image information and the number of pixels in a direction orthogonal to the one side direction, based on the detected attitude; and transmitting the calculated pixel information and the generated image information from the communication device to the display apparatus, and the display apparatus is configured to execute the steps of: segmenting an image based on the received image information depending on the received pixel information and image information; judging a size between the number of pixels in the one side direction and the number of pixels in the direction orthogonal to the one side direction in the pixel information; and displaying the segmented image on the display unit by setting the direction in which the number of pixels is larger as a vertical direction or a horizontal direction, based on the judgment result.

The display method according to the present invention may comprise the steps of: when the segmented image is displayed on the display unit by setting the direction in which the number of pixels is larger as the vertical direction, displaying two screens in which the segmented image and another image are juxtaposed on the display unit; and when the segmented image is displayed on the display unit by setting the direction in which the number of pixels is larger as the horizontal direction, displaying the segmented image on the display unit by one screen.

The display method according to the present invention may comprise the step of: displaying the image on a communication device display unit which is included in the communication device.

According to another aspect of the present invention, there is provided a display system which has a communication device configured to generate image information representing a rectangular image including a plurality of pixels, and a display apparatus connected to the communication device, including a display unit, and configured to display an image based on the image information on the display unit, the display system being characterized in that, the communication device includes: an image generation unit configured to generate the image information; an attitude detection unit configured to detect an attitude thereof and output an attitude signal representing the detected attitude; a calculation unit configured to, based on the received attitude signal, calculate pixel information representing the number of pixels in one side direction of an image and the number of pixels in a direction orthogonal to the one side direction, based on the image information; and a communication device control unit configured to transmit the calculated pixel information and the generated image information from the communication device to the display apparatus, and the display apparatus includes: an image processing unit configured to segment the image based on the received image information depending on the received pixel information and image information; a judgment unit configured to judge a size between the number of pixels in the one side direction and the number of pixels in the direction orthogonal to the one side direction in the pixel information; and a display determination unit configured to display the image segmented by the image processing unit on the display unit by setting the direction in which the number of pixels is larger as a vertical direction or a horizontal direction, based on the judgment result of the judgment unit.

In the display system according to the present invention, the display apparatus may include a tuner which receives television broadcasts, and an image which is based on the television broadcasts received by the tuner may be displayed on the display unit.

According to the present invention, it is possible to display the number of screens according to a will of user seeing the screen by receiving the signal designating the number of screens to be displayed on the display unit and setting the display screens depending on the received signal.

According to the present invention, it is possible to effectively use the screen of the display unit by generating one image by similarly enlarging the segmented image at the time of displaying two screens, and calculating a size of the other image depending on the size of the one image.

According to the present invention, it is possible to effectively use the screen of the display unit by receiving the pixel information including the information on the number of pixels in one side direction of the image and the number of pixels in the vertical direction to the one side direction, and judging the size between the number of pixels in the one side direction of the image and the number of pixels in the vertical direction to the one side direction represented by the pixel information.

The above and further objects and features will more fully be apparent from the following detailed description with accompanying drawings.

DETAILED DESCRIPTION

First Embodiment

Figure 1:
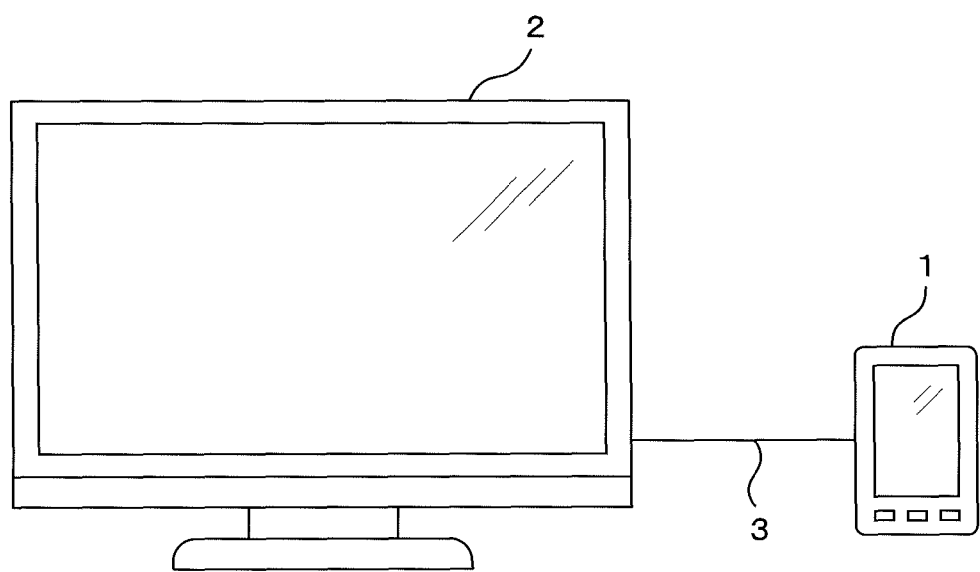
FIG. 1 is a view for describing an outline of an embodiment.

FIG. 1 is a view for describing an outline of an embodiment. A communication device 1 is connected to a television receiver 2 through a cable 3. An example of the communication device 1 may include a mobile phone, a smart phone, a personal digital assistance (PDA), a game machine, a notebook type personal computer or the like. The cable 3 is a communication cable. The communication device 1 transmits generated image information to the television receiver 2 through the cable 3. The television receiver 2 segments and displays an image, which is based on the image information, based on pixel information.

Figure 2:
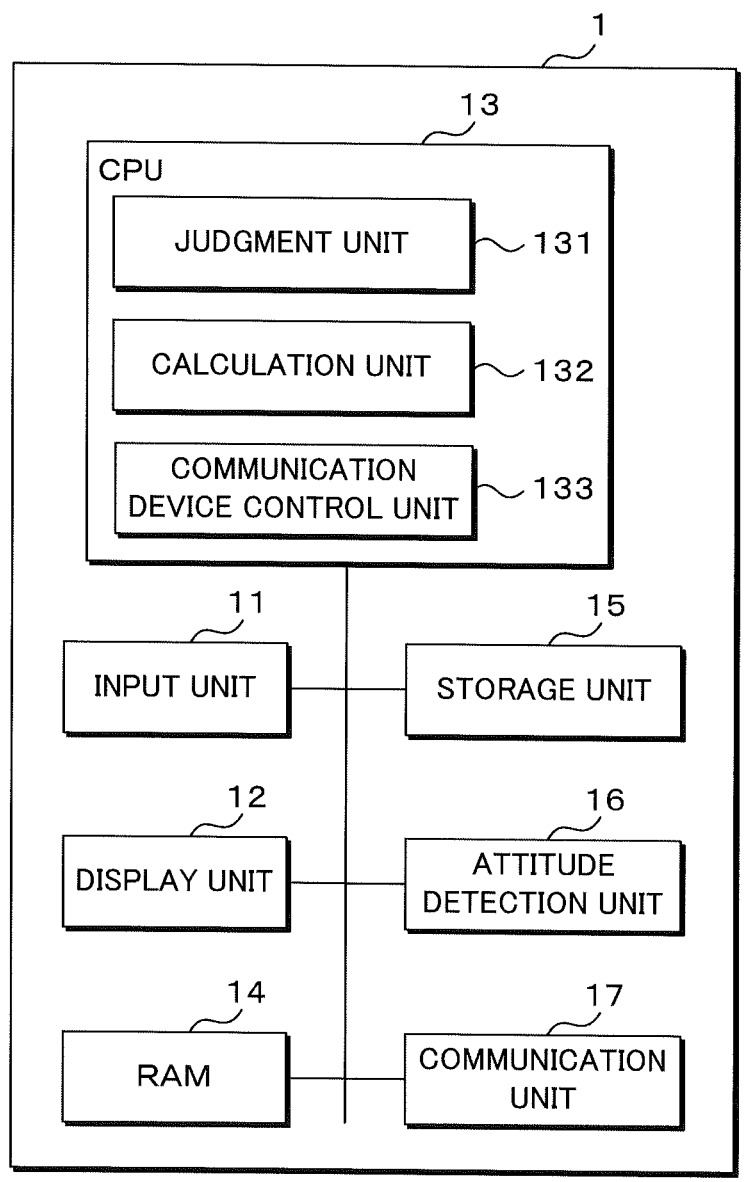
FIG. 2 is a block diagram illustrating a configuration of a communication device.

FIG. 2 is a block diagram illustrating a configuration of the communication device 1. The communication device 1 includes an input unit 11, a display unit 12, a central processing unit (CPU) 13, a random access memory (RAM) 14, a storage unit 15, an attitude detection unit 16, and a communication unit 17. The CPU 13 includes a judgment unit 131, a calculation unit 132, and a communication device control unit 133. The CPU 13 is connected to each part of hardware via a bus.

The configuration of the communication device 1 will be described. The input unit 11 is a button, a touch panel, or the like, and outputs an instruction signal instructing the CPU 13 to carry out an operation. The display unit 12 is a display such as a liquid crystal display, a plasma display, or an organic electroluminescence (EL) display, which are formed in a rectangular shape, and displays an image.

The attitude detection unit 16 is, for example, a 3-axis acceleration sensor and detects an attitude of the communication device 1 and outputs an attitude signal representing its own attitude to the CPU 13. That is, when the attitude of the communication device 1 longitudinally turns, the attitude detection unit 16 outputs the attitude signal representing a longitudinal direction to the CPU 13. Meanwhile, when the attitude of the communication device 1 laterally turns, the attitude detection unit 16 outputs the attitude signal representing a lateral direction to the CPU 13. Hereinafter, a case in which a long side of the display unit 12 faces a vertical direction is set to be a longitudinal direction and a case in which the long side faces a horizontal direction is set to be a lateral direction. Further, the attitude signal may be a signal representing any one of the four sides around a display screen which is positioned at a top thereof.

The CPU 13 reads a control program which is stored in the storage unit 15 and carries out the control program to control each part of hardware. Further, the CPU 13 writes and reads information in and from the storage unit 15.

The judgment unit 131 of the CPU 13 receives the attitude signal outputted from the attitude detection unit 16 and judges whether the attitude signal is a signal representing the longitudinal direction or a signal representing the lateral direction.

When the judgment unit 131 judges that the attitude signal is the signal representing the longitudinal direction, the calculation unit 132 generates the image information which becomes a longitudinally long image in accordance with a size of the display unit 12 and outputs the image information to the display unit 12. The image based on the image information may be a still image or a moving image, and may be a display screen of applications, a menu screen, or the like. When the judgment unit 131 judges that the attitude signal is the signal representing the lateral direction, the calculation unit 132 generates the image information which becomes a laterally long image in accordance with the size of the display unit 12 and outputs the image information to the display unit 12. Further, the calculation unit 132 does not depend on the fixed attitude signal and may perform a calculation to display an image so as to become in a specific direction.

Further, the calculation unit 132 generates the pixel information. The pixel information includes information on the number of pixels in a longitudinal direction and a lateral direction, and on a segmentation position representing a position of a pixel which is a reference segmenting the image. For example, when a longitudinally long image having a fixed aspect ratio such as a photograph, a moving image, or the like is displayed in the state in which the communication device 1 laterally turns, the image is not displayed at both side portions of the display unit 12. In this case, it is preferable to appropriately segment only a region in which the image is present. Therefore, the CPU 23 to be described below carries out processing for segmenting only a part of a region in which a display content is present, based on the pixel information generated by the calculation.

Figure 3:
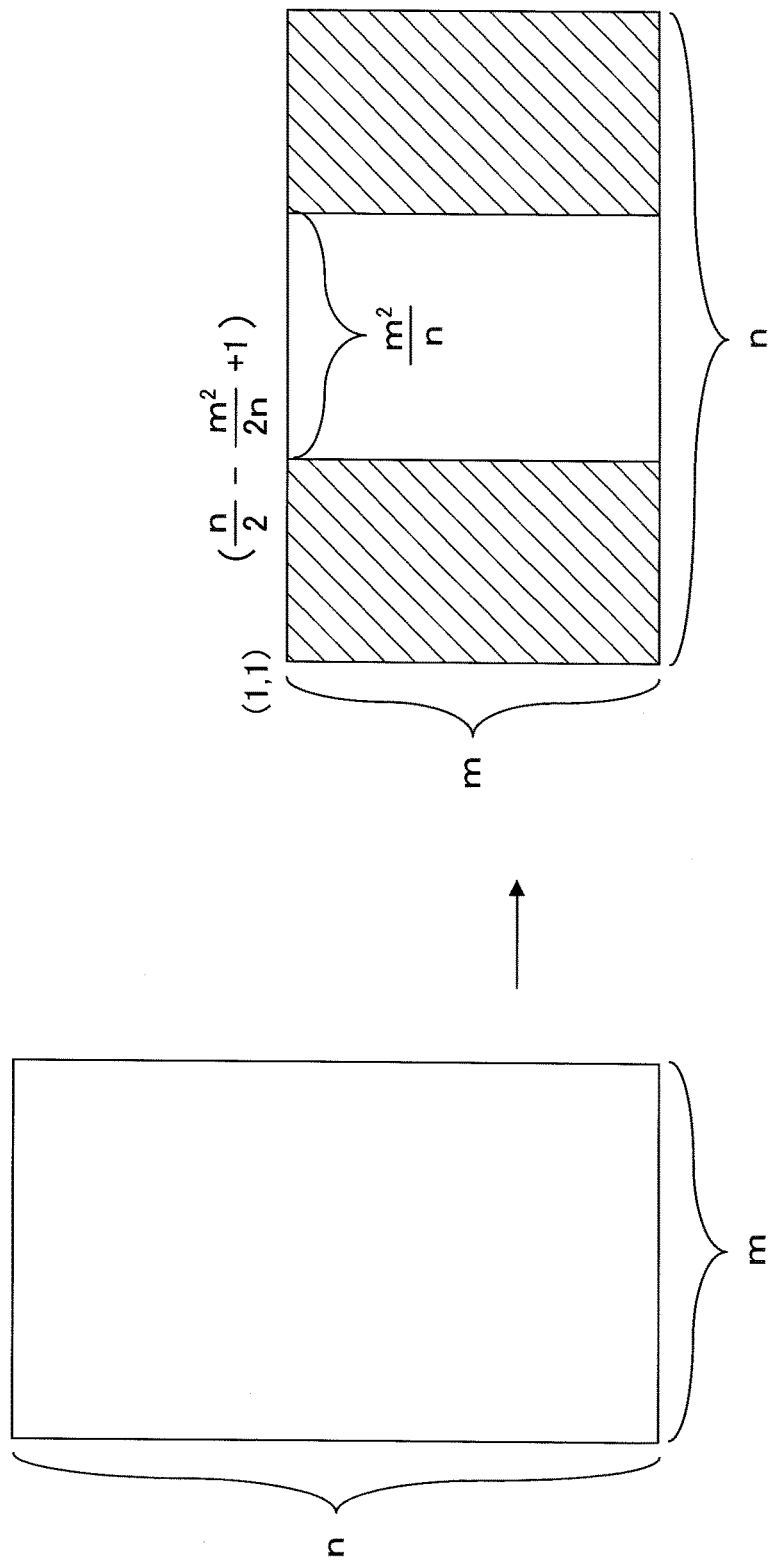
FIG. 3 is a view for describing pixel information.

FIG. 3 is a view for describing the pixel information. The number of pixels in one side direction of the display unit 12 and the other side direction orthogonal to the one side direction thereof are each set to be n pixels and m pixels (n>m). When the displayed image is a longitudinally long image having an aspect ratio of n:m, when the communication device 1 is a longitudinal direction, an image is displayed on the whole screen of the display unit 12.

Meanwhile, the case in which the communication device 1 is a lateral direction will be described. In this case, the calculation unit 132 carries out a calculation so as to similarly reduce the longitudinally long image having the aspect ratio of n:m and dispose the similarly reduced image at a center of the display unit 12 and then display the same.

In FIG. 3, coordinates of x rows x y columns of the display unit 12 are set to be (x, y) and an upper left pixel is set to be (1, 1). The longitudinally long image having the aspect ratio of n:m is similarly reduced and thus becomes an image having m pixels in a longitudinal direction and $m^2/n$ pixels in a lateral direction. When the image is disposed at the center of the display unit 12, the image becomes an image having m pixels in a longitudinal direction and $m^2/n$ pixels in a lateral direction by defining $(n/2-m^2/2n+1, 1)$ as an upper left apex. A position represented by the $(n/2-m^2/2n+1, 1)$ is a segmentation position. Information obtained by adding information on the m pixels in the longitudinal direction and the $m^2/n$ pixels in the lateral direction representing the size of the image to be segmented to the information on the segmentation position is the pixel information. By doing so, the calculation unit 132 generates the pixel information by the calculation.

When the communication device 1 is connected to an external device such as the television receiver 2, the communication device control unit 133 transmits the same image information as the image information representing the image to be displayed on the display unit 12 to the external device through the communication unit 17. Therefore, the image information on the region in which the image is not displayed is transmitted to the external device.

An example of the RAM 14 may include a static RAM (SRAM), a dynamic RAM (DRAM), a flash memory or the like. Further, the RAM 14 is temporarily stored with various data generated when the CPU 13 executes various programs.

An example of the storage unit 15 may include an electrically erasable programmable ROM (EEPROM), a hard disk drive (HDD), a flash memory or the like. The storage unit 15 is stored with programs required to allow the CPU 13 to function each part of hardware of the communication device 1. Further, the storage unit 15 is also stored with the pixel information corresponding to the image information.

The communication unit 17 is a network interface and is connected with the cable 3. The communication unit 17 may be a mobile high-definition link (MHL) (registered trademark) type interface or a Miracast (registered trademark) type interface, in addition to an HDMI (registered trademark) type interface. The cable 3 is, for example, an HDMI (registered trademark) cable, and can be connected to electronic devices including the television receiver 2 to transmit and receive information based on a prescribed standard. Further, instead of the cable 3, for example, the information may be transmitted and received through a wireless local area network (LAN).

Figure 4:
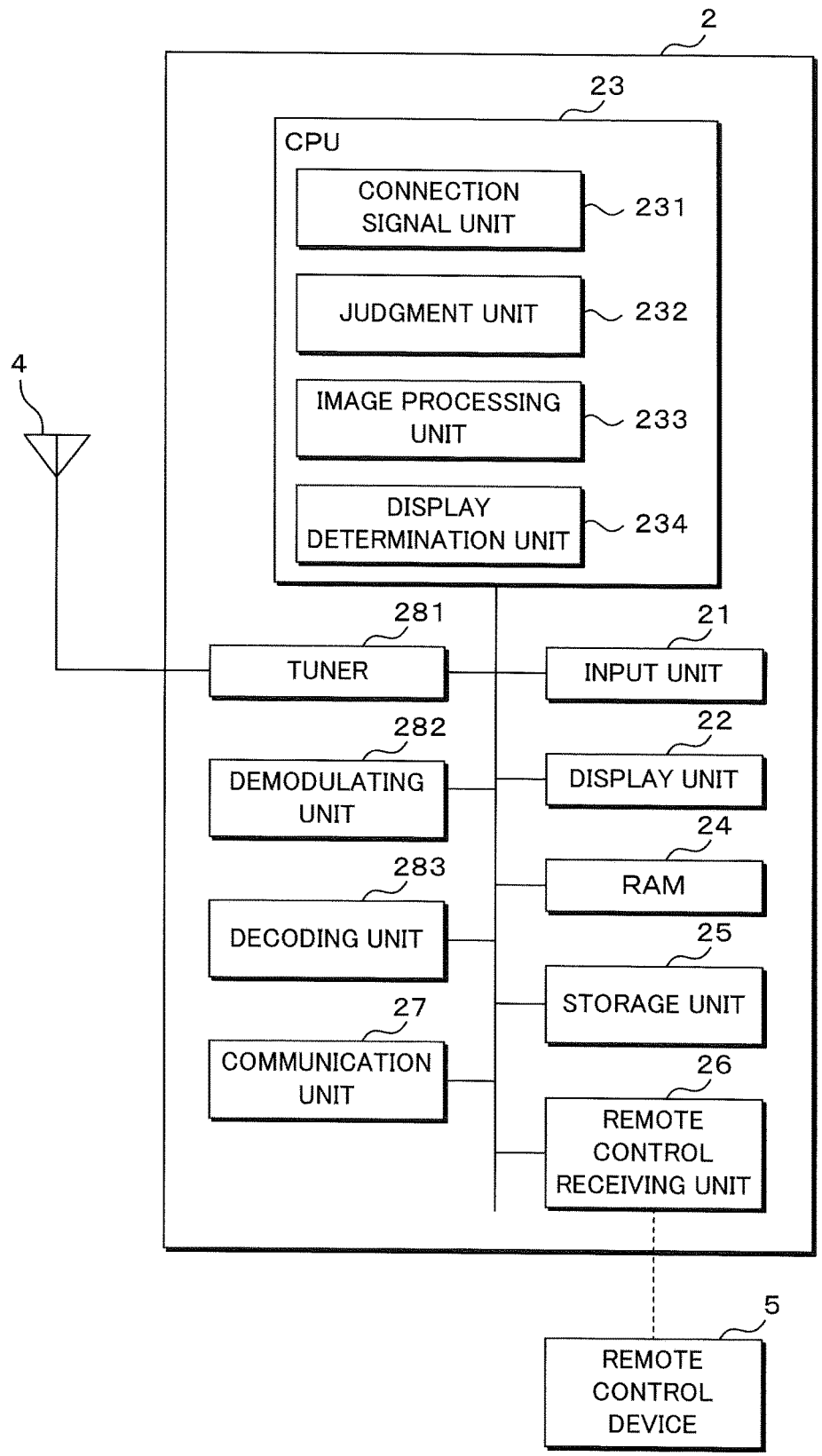
FIG. 4 is a block diagram illustrating a configuration of a television receiver.

FIG. 4 is a block diagram illustrating a configuration of the television receiver 2. The television receiver 2 includes an input unit 21, a display unit 22, a CPU 23, a RAM 24, a storage unit 25, a communication unit 27, a remote control receiving unit 26, a tuner 281, a demodulating unit 282, and a decoding unit 283. The tuner 281 is connected to a broadcast wave receiving antenna 4 which is provided outside the television receiver 2. Further, the CPU 23 includes a connection signal unit 231, a judgment unit 232, an image processing unit 233, and a display determination unit 234. The television receiver 2 displays an image on the display unit 22 of the display apparatus based on television broadcasts received by the tuner 281.

The tuner 281 receives the television broadcasts from the broadcast wave receiving antenna 4. The television broadcasts include program information signals, and the like representing program information, etc., representing a title, date and time, and the cast of the program, in addition to video image signals and voice signals of each channel in a modulated state by an orthogonal frequency division multiplexing (OFDM) scheme. The tuner 281 extracts a signal of a specific channel among the program information signals, and the tuner 281 outputs the extracted signal to the demodulating unit 282.

The demodulating unit 282 demodulates the extracted signal to stream data in the form of a moving picture experts group (MPEG)-2 transport stream (TS), MPEG4, or the like, and outputs the demodulated signal to the decoding unit 283. Further, the demodulating unit 282 performs error correction processing on separated signals for each channel together with the demodulation processing.

The decoding unit 283 decodes the inputted stream data to separate the video image information. The decoding unit 283 outputs the video image data to the display unit 22 of the liquid crystal display, the organic EL display, the plasma display, or the like.

The communication unit 27 is the network interface, and connected with the cable 3. The communication unit 27 may be the mobile high-definition link (MHL) (registered trademark) type interface and the Miracast (registered trademark) type interface, in addition to the HDMI (registered trademark) type interface. When the CPU 13 and the CPU 23 transmit and receive various information each other, the signal is transmitted and received via the communication unit 17, the communication unit 27, and the cable 3.

The input unit 21 is, for example, a button, and by being pressed, outputs an instruction signal instructing a turn on/off of a power supply, channel setting, and the like to the CPU 23. The display unit 22 is the rectangular display such as the liquid crystal display, the plasma display, or an organic electroluminescence (EL) display, and displays an image. The display unit 22 is disposed so as to be laterally long. The display unit 22 can display a larger number of pixels than the display unit 12.

The CPU 23 reads a control program which is stored in the storage unit 25 and carries out the control program to control each part of the hardware. Further, the CPU 23 writes and reads information in and from the storage unit 25.

When the communication unit 17 and the communication unit 27 are connected with each other through the cable 3, the connection signal unit 231 of the CPU 23 transmits a connection signal to the CPU 13. When receiving the pixel information, the judgment unit 232 judges a size between the number of pixels in the longitudinal direction and the number of pixels in the lateral direction, in the pixel information.

The image processing unit 233 segments the image, which is based on the image information, based on the pixel information. That is, the image based on the image information is segmented to generate an image segmented within a range of m pixels in the longitudinal direction and $m^2/n$ pixels in the lateral direction from the segmentation position $(n/2-m^2/2n+1, 1)$. Further, the image processing unit 233 carries out processing for enlarging the segmented image so as to correspond to the number of pixels of the display unit 22.

The display determination unit 234 sets the number of screens depending on the judgment result of the judgment unit 232. That is, when the judgment unit 232 judges that the number of pixels in the longitudinal direction is larger than that in the lateral direction, the display determination unit 234 is set so as to display two screens by juxtaposing the same left and right by setting a first screen as a left and setting a second screen as a right. The first screen is a screen representing the image based on the television broadcasts, and the second screen is a screen representing the image obtained by enlarging the segmented image. The display determination unit 234 displays two screens of the first screen and the second screen on the display unit 22 by juxtaposing the same. Herein, when the first screen is displayed on the display unit 22, the display determination unit 234 is set as the screen as described above.

Meanwhile, when the judgment unit 232 judges that the number of pixels in the longitudinal direction is not larger than that in the lateral direction, the display determination unit 234 is set so as to display the second screen, and displays one screen of only the second screen on the display unit 22. When the first screen is displayed on the display unit 22, the display determination unit 234 switches the first screen to the second screen, and displays the second screen on the display unit 22.

Figure 5:
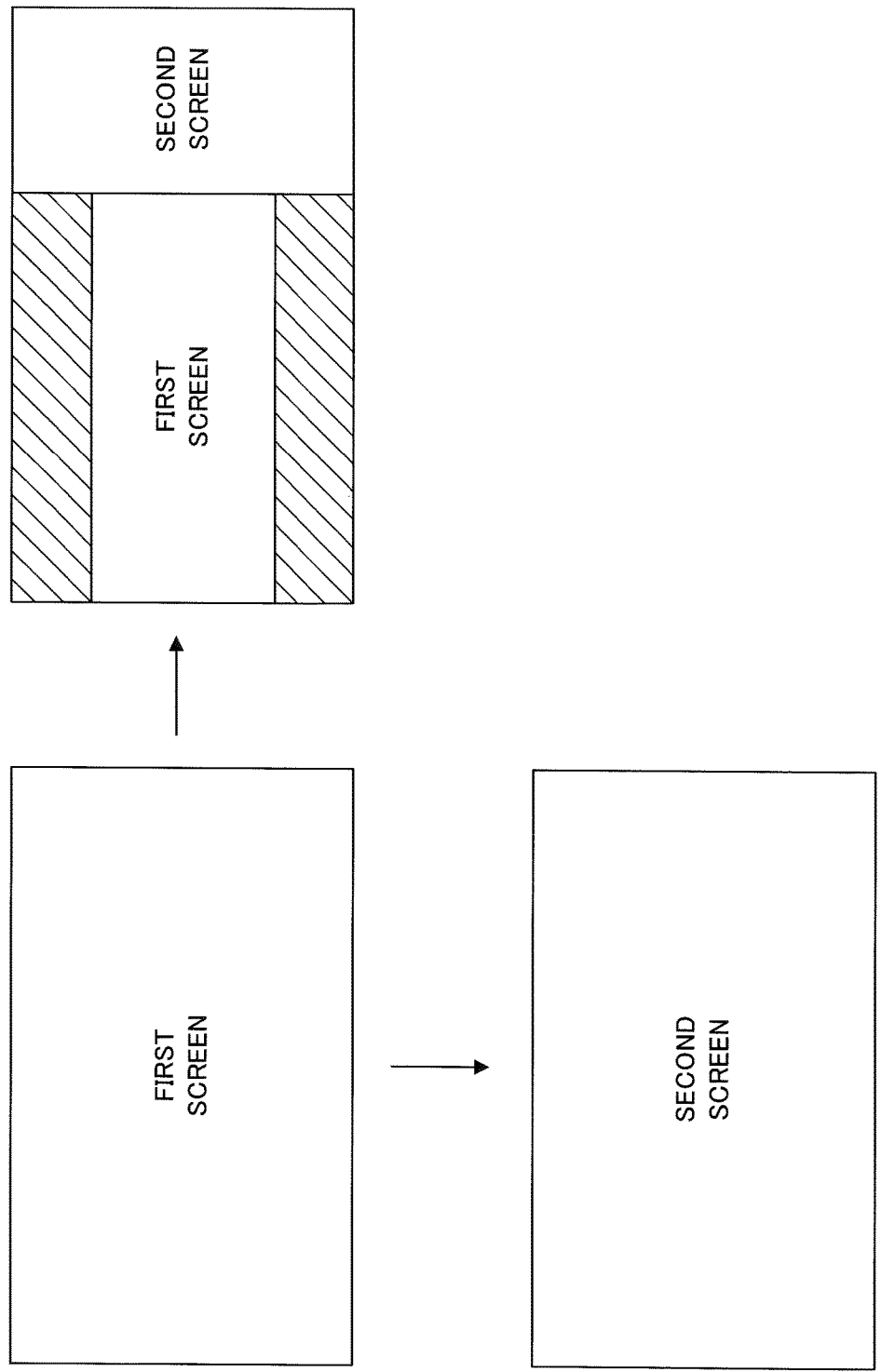
FIG. 5 is a schematic view of a screen display.

FIG. 5 is a schematic view of the screen display. When the first screen is displayed on the display unit 22, when the judgment unit 232 judges that the number of pixels in the longitudinal direction is larger than that in the lateral direction, the display determination unit 234 displays two screens of the first screen and the second screen on the display unit 22 by juxtaposing the same. When the judgment unit 232 judges that the number of pixels in the longitudinal direction is not larger than that in the lateral direction, the display determination unit 234 displays the second screen.

Figure 6:
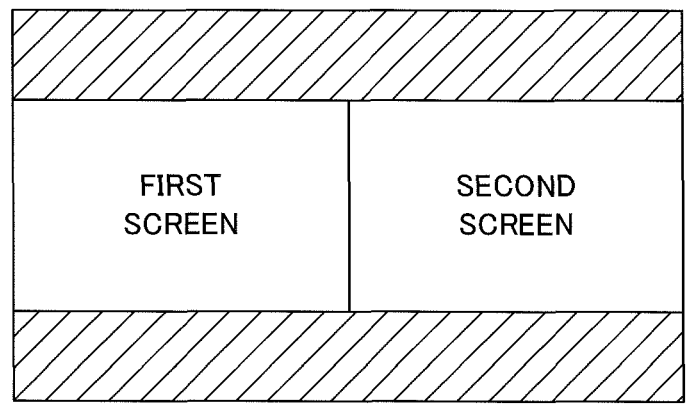
FIG. 6 is a schematic view illustrating another example of the screen display.

FIG. 6 is a schematic view illustrating another example of the screen display. When the judgment unit 232 judges that the number of pixels in the longitudinal direction is not larger than that in the lateral direction, the display determination unit 234 may display the first screen and the second screen by juxtaposing the same.

An example of the RAM 24 may include the static RAM (SRAM), the dynamic RAM (DRAM), the flash memory or the like. Further, the RAM 24 is temporarily stored with various data generated when the CPU 23 executes various programs.

An example of the storage unit 25 may include the electrically erasable programmable ROM (EEPROM), the hard disk drive (HDD), the flash memory or the like. The storage unit 25 is stored with programs required to allow the CPU 23 to function each part of hardware of the television receiver 2. Further, the storage unit 25 is stored with the transmitted image information and the pixel information corresponding to the image information.

The remote control receiving unit 26 is, for example, a photo sensor and receives a signal by infrared communication. The remote control receiving unit 26 may be a receiving device, etc., of wireless communication which is defined by a wireless LAN standard. The remote control receiving unit 26 outputs the control signal received from a remote control device 5, which is a device outside the television receiver 2, to the CPU 23. The control signal is a signal instructing channel setting, a control of image quality, and the like. The CPU 23 carries out a control based on the inputted control signal.

Further, the television receiver 2 may include an external input terminal for inputting a video image signal from the outside such as a recorder device, an Internet line or the like. In this case, the first screen may be a screen which displays the image based on the information inputted from the external input terminal.

An operation of the communication device 1 will be described. The attitude detection unit 16 of the communication device 1 detects an attitude thereof and outputs the attitude signal representing the detected attitude to the judgment unit 131. The judgment unit 131 receives the attitude signal to judge the attitude. The calculation unit 132 generates the image information based on the judgment result by the judgment unit 131. The communication device control unit 133 outputs the image information generated by the calculation unit 132 to the display unit 12. The display unit 12 displays the image based on the inputted image information.

Meanwhile, when the communication unit 17 and the communication unit 27 are connected with each other through the cable 3, the CPU 13 receives the connection signal representing that it is a signal transmitted from the connection signal unit 231. The communication device control unit 133 receives the connection signal to transmit the pixel information and the image information to the CPU 23.

An operation of the television receiver 2 will be described. When the communication unit 27 is connected with the communication unit 17, the judgment unit 232 of the CPU 23 of the television receiver 2 receives the pixel information and the image information transmitted from the CPU 13. The judgment unit 232 judges whether the number of pixels in the longitudinal direction of the pixel information is larger than that in the lateral direction.

The display determination unit 234 sets the screen to be displayed depending on the judgment result of the judgment unit 232. That is, when the judgment unit 232 judges that the number of pixels in the longitudinal direction is larger than that in the lateral direction, the display determination unit 234 is set so as to display two screens of the first screen and the second screen on the display unit 22 by juxtaposing the same. Meanwhile, when the judgment unit 232 judges that the number of pixels in the longitudinal direction is not larger than that in the lateral direction, the display determination unit 234 is set so as to display the second screen. The display determination unit 234 displays the screen on the display unit 22 depending on the setting.

Figure 7:
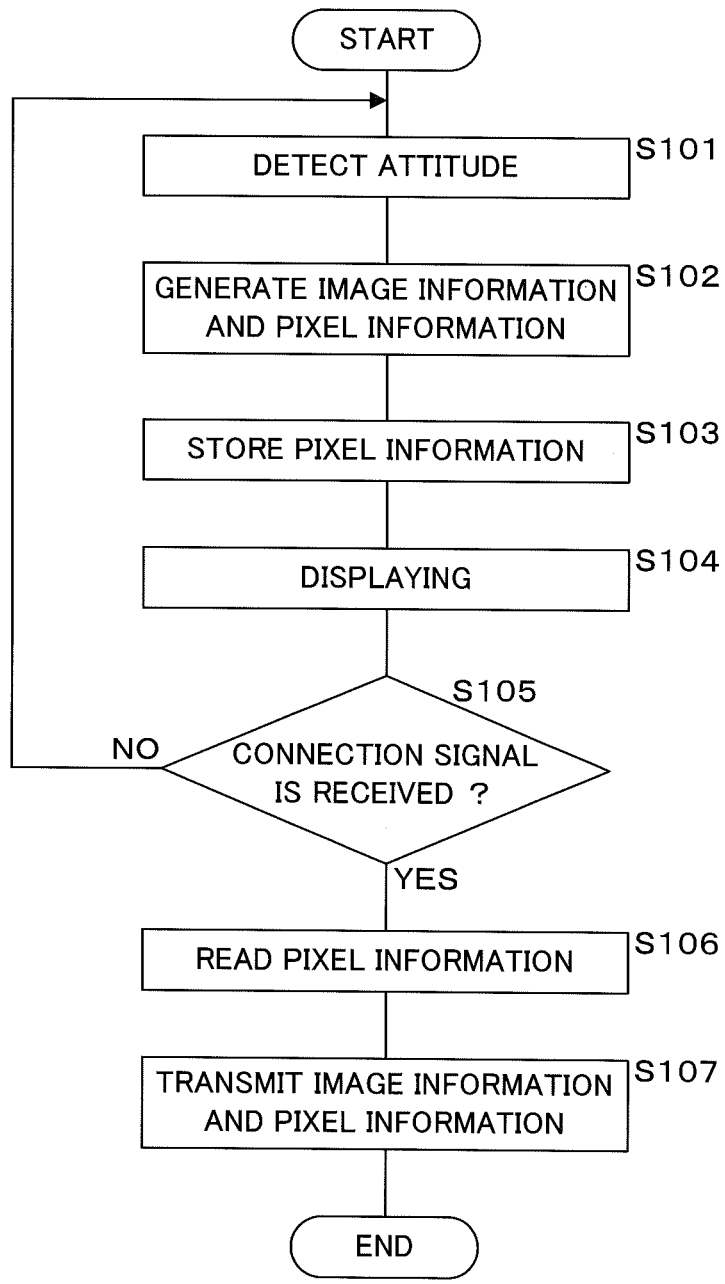
FIG. 7 is a flow chart illustrating an operation processing of a CPU.

Next, operation processing which is executed by the CPU 13 will be described. FIG. 7 is a flow chart illustrating the operation processing of the CPU 13. The CPU 13 inputs the attitude signal from the attitude detection unit 16 (S101), and generates the image information and the pixel information depending on the attitude signal (S102). Further, the pixel information is stored in the storage unit 15 (S103). The CPU 13 displays the image based on the generated image information on the display unit 12 (S104).

Meanwhile, the CPU 13 judges whether the connection signal is received (S105). When it is judged that the connection signal is not received (NO in S105), the CPU 13 again receives the attitude signal (return to S101). When it is judged that the connection signal is received (YES in S105), the CPU 13 reads the pixel information from the storage unit 15 (S106). The CPU 13 transmits the read pixel information and the generated image information to the CPU 23 (S107), and ends the processing.

Figure 8:
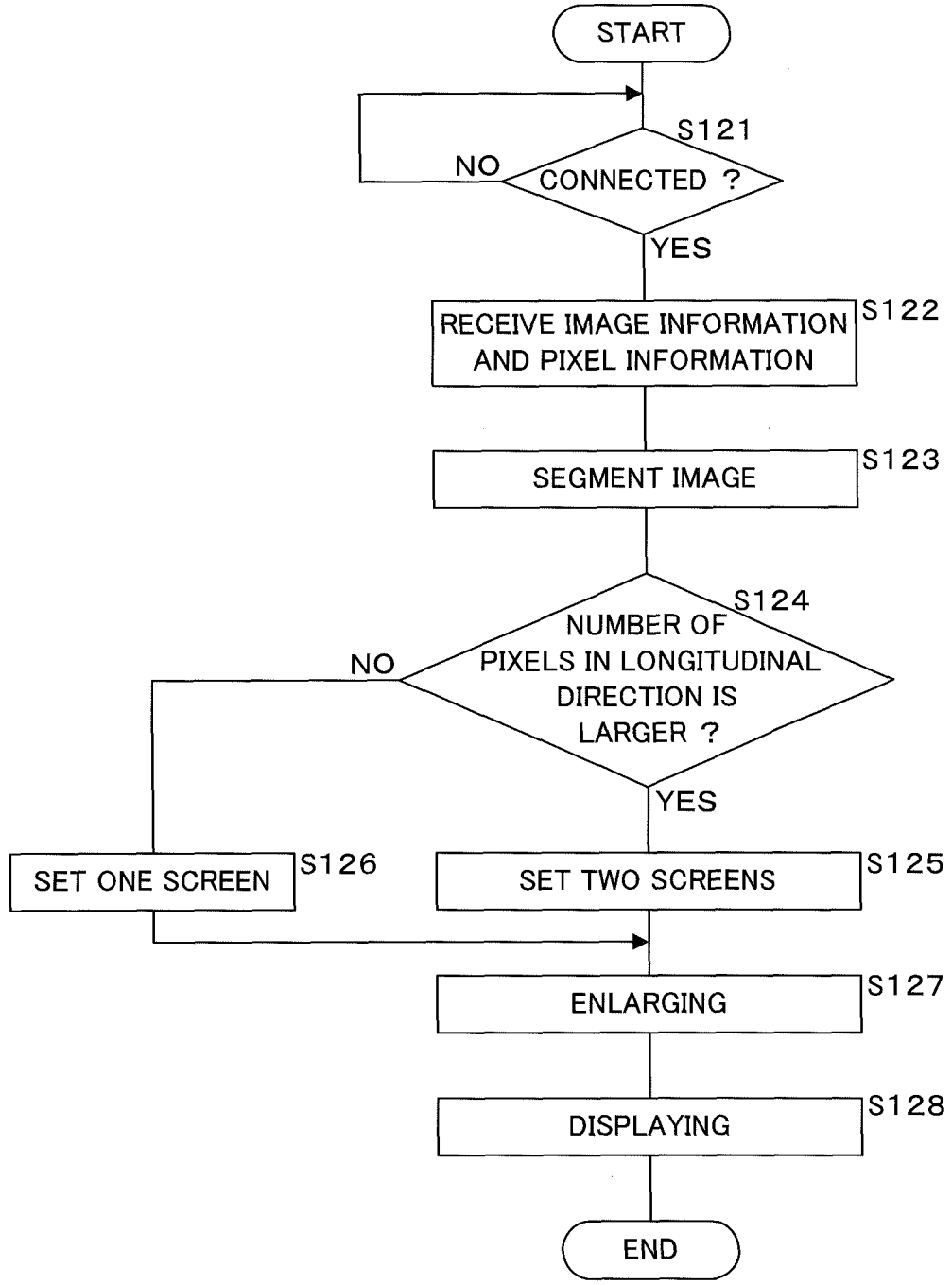
FIG. 8 is a flow chart illustrating an operation processing of a CPU.

Meanwhile, the operation processing which is executed by the CPU 23 will be described. FIG. 8 is a flow chart illustrating the operation processing of the CPU 23. The CPU 23 judges whether the communication unit 17 and the communication unit 27 are connected with each other (S121). When it is judged that these communication units are not connected (NO in S121), the CPU 23 keeps waiting (return to S121). When it is judged that these communication units are connected with each other (YES in S121), the CPU 23 receives the pixel information and the image information which are transmitted from the CPU 13 (S122). Further, the CPU 23 segments the image, which is based on the image information, based on the pixel information (S123). The CPU 23 judges whether the number of pixels in the longitudinal direction of the pixel information is larger than that in the lateral direction (S124). As the judgment result, when the number of pixels in the longitudinal direction is larger than that in the lateral direction (YES in S124), the CPU 23 is set so as to display two screens of the first screen and the second screen on the display unit 22 by juxtaposing the same (S125).

Meanwhile, as the judgment result, when the number of pixels in the longitudinal direction is not larger than that in the lateral direction (NO in S124), the CPU 23 is set so as to display the second screen (S126). The CPU 23 carries out the processing for enlarging the image displayed by the image information in accordance with the size of the display unit 22 (S127), displays the set screen on the display unit 22 (S128), and ends the processing.

According to the embodiment of the present invention, it is judged that a size between the number of pixels in one side direction and the number of pixels in a direction orthogonal to the one side, and based on the judgment result, the image segmented by setting the direction in which the number of pixels is larger as the vertical direction or the horizontal direction is displayed on the display unit 22. Thereby, the display screen of the display unit 22 can be effectively used.

Second Embodiment

A second embodiment of the present invention will be described. According to the present embodiment, when two screens are displayed, the size of the first screen is set depending on the size of the second screen.

Processing for setting the size of the display screen in accordance with the first screen will be described. The image processing unit 233 carries out the same processing as the first embodiment of the present invention, and carries out the processing for segmenting the image information and similarly enlarging the segmented image, based on the pixel information. Herein, the image processing unit 233 carries out enlarging so that the number of pixels in the vertical direction of the segmented image coincides with the number of pixels in the vertical direction of the display unit 22.

Meanwhile, the display determination unit 234 sets the number of pixels in the horizontal direction of the first screen as the number of pixels obtained by subtracting the number of pixels in the horizontal direction of the second screen from the number of pixels in the horizontal direction of the display unit 22. The display determination unit 234 sets the number of pixels in the vertical direction of the first screen so that a ratio of the number of pixels in the vertical direction to the number of pixels of the horizontal direction of the display unit 22 is equal to the ratio of the first screen.

Figure 9:
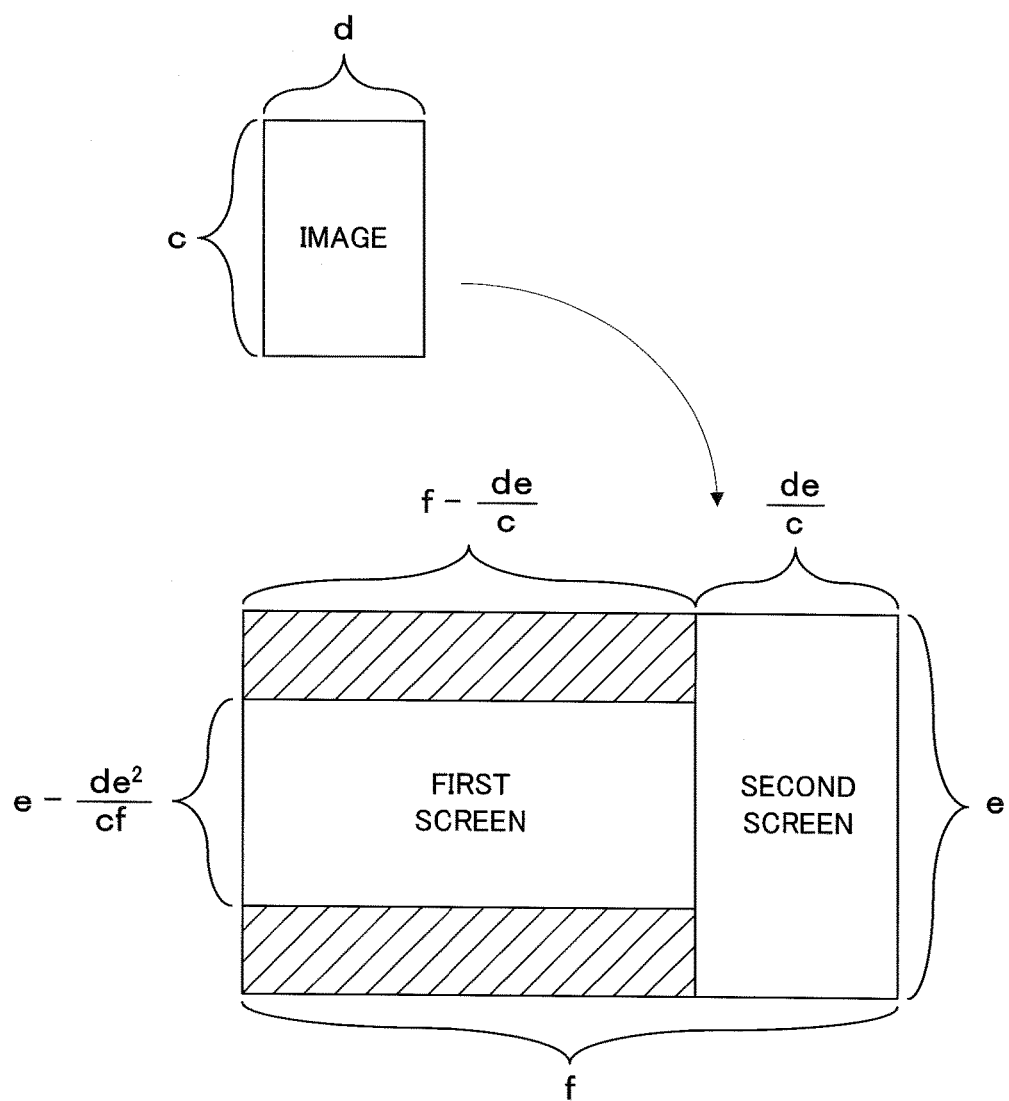
FIG. 9 is a view for describing a size of two screens.

Processing for allowing the display determination unit 234 to set the display screen will be described in detail. FIG. 9 is a view for describing the size of two screens. The number of pixels of the display unit 22 is e pixels in a vertical direction and f pixels in a horizontal direction, and the image segmented by the CPU 23 based on the pixel information is c pixels in a longitudinal direction and d pixels in a lateral direction. The display determination unit 234 is set so as to display the second screen, which has the e pixels in the vertical direction and de/c pixels in the horizontal direction, at the right side of the display unit 22. Herein, the image processing unit 233 carries out processing for setting the segmented image as an image having the e pixels in the longitudinal direction and the de/c pixels in the lateral direction.

Meanwhile, the display determination unit 234 sets the number of pixels in the horizontal direction of the first screen as f−de/c pixels obtained by subtracting the de/c pixels from the f pixels. The ratio of the number of pixels in the vertical direction to the number of pixels in the horizontal direction of the first screen is e:f, as equal to the display unit 22. Therefore, the display determination unit 234 carries out processing for setting the number of pixels in the vertical direction of the first screen as $e-de^2/cf$ obtained by multiplying the number of pixels in the horizontal direction by e/f.

For example, the segmented image has 480 pixels in a longitudinal direction and 320 pixels in a lateral direction, and when the display unit 22 has 1080 pixels in a vertical direction and 1920 pixels in a horizontal direction, the image processing unit 233 carries out processing for multiplying the longitudinal direction of the segmented image by 1080/480=9/4. The segmented image has 320×9/4=720 pixels in the lateral direction. Therefore, the display determination unit 234 is set so as to display the second screen, which has 1080 pixels in the vertical direction and 720 pixels in the horizontal direction, at the right side of the display unit 22. Meanwhile, the display determination unit 234 sets so that the first screen has 1920−720=1200 pixels in the horizontal direction and 1200×9/16=675 pixels in the vertical direction, and so as to display the first screen at the left side of the display unit 22.

Further, in order to easily see two screens, a region, which has a width of a predetermined number of pixels in the horizontal direction and does not display an image, is provided between the first screen and the second screen.

Figure 10:
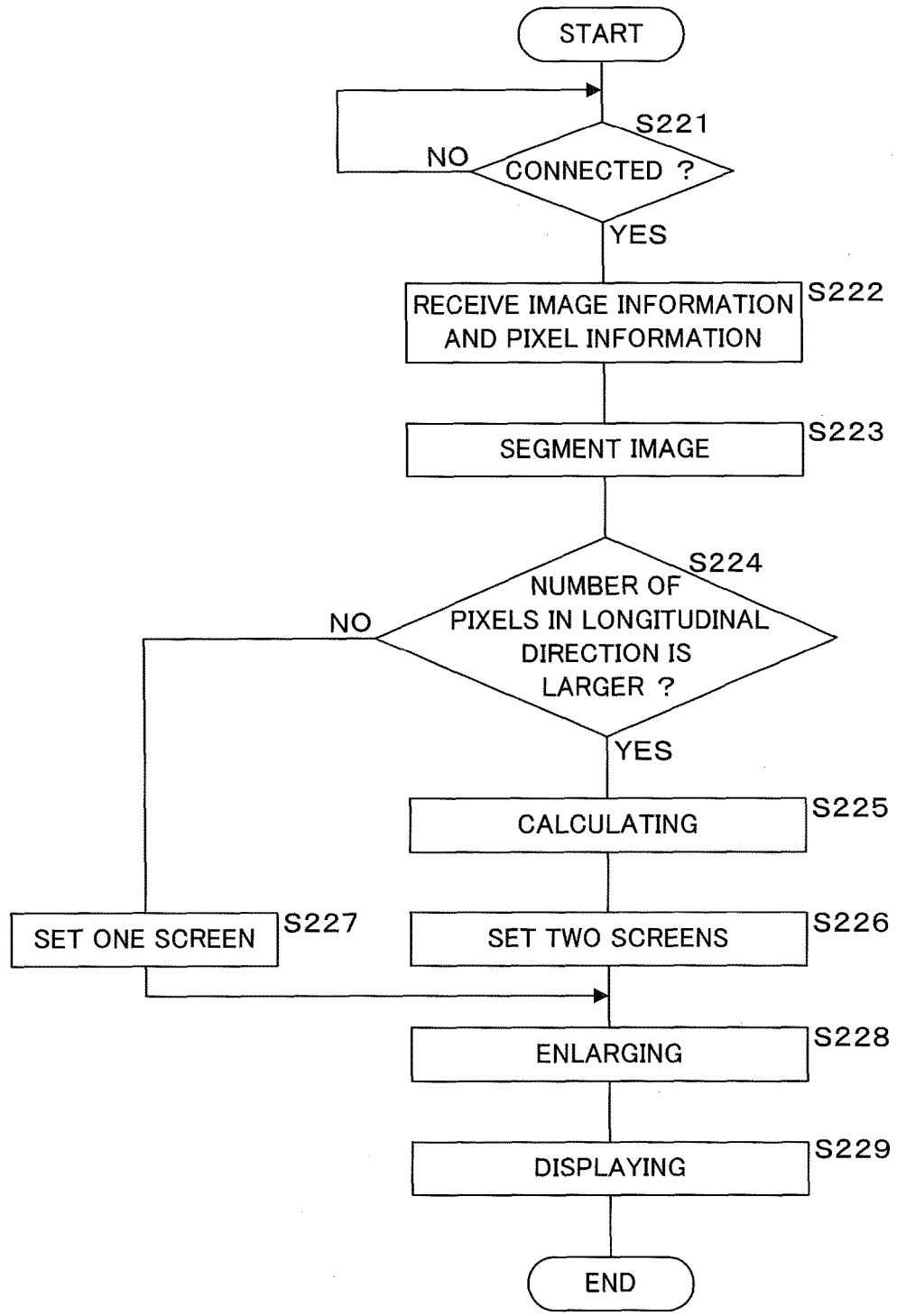
FIG. 10 is a flow chart illustrating an operation processing of a CPU.

FIG. 10 is a flow chart illustrating the operation processing of the CPU 23. The CPU 23 judges whether the communication unit 17 and the communication unit 27 are connected with each other (S221). When it is judged that these communication units are not connected (NO in S221), the CPU 23 keeps waiting (return to S221). When it is judged that these communication units are connected with each other (YES in S221), the CPU 23 receives the pixel information and the image information which are transmitted from the CPU 13 (S222). Further, the CPU 23 segments the image, which is based on the image information, based on the pixel information (S223). The CPU 23 judges whether the number of pixels in the longitudinal direction of the pixel information is larger than that in the lateral direction (S224). As the judgment result of the CPU 23, when the number of pixels in the longitudinal direction is larger than that in the lateral direction (YES in S224), the CPU 23 carries out the calculation of setting the size of the first screen and the second screen (S225). The CPU 23 sets so as to display two screens of the first screen and the second screen having a set size on the display unit 22 by juxtaposing the same (S226), and progresses the processing after S228 to be described below.

Meanwhile, as the judgment result, when the number of pixels in the longitudinal direction is not larger than that in the lateral direction (NO in S224), the CPU 23 sets so as to display one screen of only the second screen (S227). The CPU 23 carries out the processing for enlarging the image displayed by the image information in accordance with the size of the display unit 22 (S228), displays the image (S229), and ends the processing.

According to the present embodiment, when the display unit 22 displays two screens, a size of another image is set depending on a size of one image, and therefore the display unit 22 can be effectively used.

Third Embodiment

A third embodiment of the present invention will be described. According to the present embodiment, the screen display of the display unit 22 can be arbitrarily switched between one-screen display and two-screen display.

When the communication unit 17 and the communication unit 27 are connected with each other through the cable 3, the communication device 1 first transmits a designation signal designating the number of screens. For example, when the display unit 22 displays one screen of the first screen, the communication device 1 transmits the designation signal designating the number of screens as two screens. In this case, the communication device 1 allows for the designation signal to be transmitted based on the attitude detected by the attitude detection unit 16 of the communication device 1, so that one screen of the first screen is displayed when the attitude is the lateral direction, and two screens of the first screen and the second screen are displayed when the attitude is the longitudinal direction.

Further, the designation signal may be transmitted from the remote control device 5 and may be received by the CPU 23 through the remote control receiving unit 26. In addition, the designation signal may be a signal instructing the switching between the one-screen display and the two-screen display.

The designation signal is transmitted from the CPU 13 and is received by the CPU 23 through the communication units 17 and 27 and the cable 3. In this case, the CPU 23 performs the processing for allowing the display unit 12 to display two screens of the first screen and the second screen depending on the designation signal.

Meanwhile, when the display unit 22 displays two screens of the first screen and the second screen, the communication device 1 transmits the designation signal designating the number of screens as one screen. The transmitted designation signal is received by the CPU 23. In this case, the CPU 23 performs the processing for allowing the display unit 12 to display one screen of the second screen depending on the designation signal.

Figure 11:
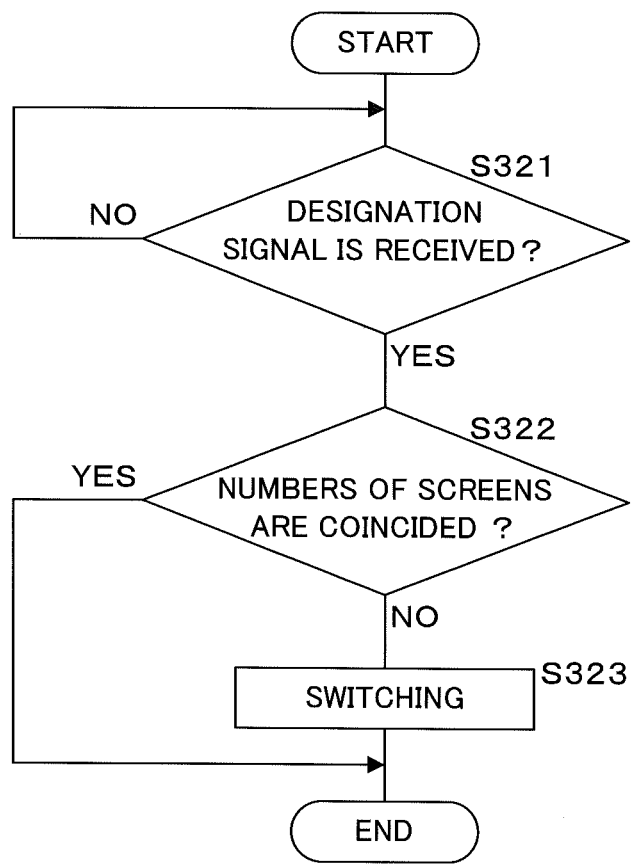
FIG. 11 is a flow chart illustrating an operation processing of a CPU.

FIG. 11 is a flow chart illustrating the operation processing of the CPU 23. The CPU 23 judges whether the designation signal is received (S321). When it is judged that the designation signal is not received (NO in S321), the CPU 23 keeps waiting (return to S321). When it is judged that the designation signal is received (YES in S321), the CPU 23 judges whether the number of screens displayed on the display unit 22 at the receiving timing coincides with the number of screens designated by the designation signal (S322). When both numbers of screens coincide with each other (YES in S322), the CPU 23 ends the processing, while keeping the number of screens. When both numbers of screens do not coincide (NO in S322), the CPU 23 switches the number of screens displayed by the display unit 22 (S323), and ends the processing.

According to the present embodiment, the screen displayed by the display unit 22 can be designated as one screen or two screens, and therefore a screen desired by the viewer can be displayed.

Fourth Embodiment

A fourth embodiment of the present invention will be described. According to the present embodiment, when the screen display is the two-screen display, the left and right screens can be replaced.

When two screens are displayed on the display unit 22 by being juxtaposed left and right, so that the first screen is at the left side and the second screen is at the right side, the remote control device 5 transmits a replacement signal instructing the replacement of the left and right screens. The replacement signal is received by the CPU 23 through the remote control receiving unit 26. The CPU 23 performs the processing for setting the first screen at the right side and the second screen at the left side depending on the replacement signal.

Further, the replacement signal may be transmitted from the communication device 1, and may be received by the CPU 23.

Figure 12:
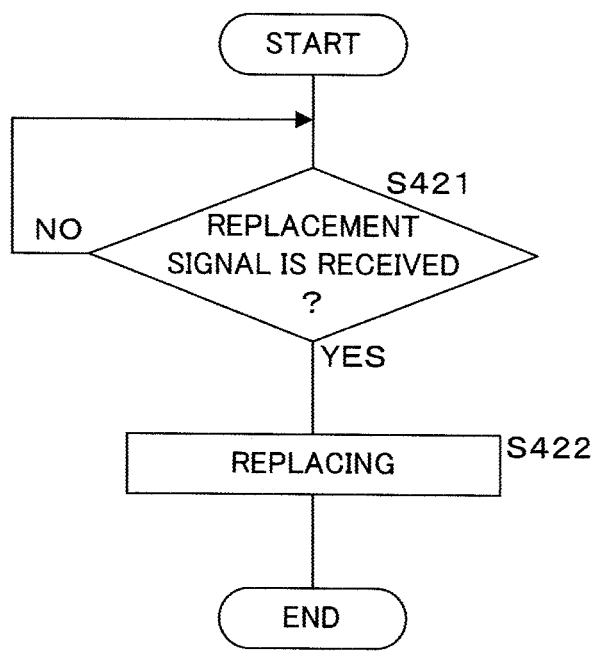
FIG. 12 is a flow chart illustrating an operation processing of a CPU.

FIG. 12 is a flow chart illustrating the operation processing of the CPU 23. The CPU 23 judges whether the replacement signal is received (S421). When it is judged that the replacement signal is not received (NO in S421), the CPU 23 keeps waiting (return to S421). When it is judged that the replacement signal is received (YES in S421), the CPU 23 replaces the disposition of two screens (S422), and ends the processing.

According to the present embodiment, when the display unit 22 displays two screens, the juxtaposed screen can be replaced, and therefore a screen desired by the viewer can be displayed.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

The invention claimed is:

1. A display apparatus which segments a display image from an original image and displays the display image on a display unit, the display apparatus comprising:
   one or more processing devices; and
   one or more storage devices storing instructions that, when executed by the one or more processing devices, cause the one or more processing devices to;
   receive information on a segmentation position and a segmentation size and segment the display image from the original image based on the received information;
   judge the number of pixels in a longitudinal direction and the number of pixels in a lateral direction of the segmented display image; and
   display two screens of the display image and another image on the display unit when the number of pixels in the longitudinal direction of the segmented display image is larger than that in the lateral direction thereof, and to display one screen of the display image on the display unit when the number of pixels in the lateral direction of the segmented display image is larger than that in the longitudinal direction thereof.

2. The display apparatus according to claim 1, wherein the display unit is laterally long.

3. The display apparatus according to claim 1, wherein the display unit, when displaying the two screens, similarly enlarges the display image and calculates a size of the other image depending on a size of the enlarged display image.

4. The display apparatus according to claim 1, wherein the display unit, when displaying the two screens, receives a replacement signal instructing a replacement of the screen and replaces a display position of the display image and the other image depending on the received replacement signal.

5. A display method which segments a display image from an original image and displays the display image on a display unit, the display method comprising steps of:

receiving information on a segmentation position and a segmentation size;

segmenting the display image from the original image based on the received information;

judging the number of pixels in a longitudinal direction and the number of pixels in a lateral direction of the segmented display image;

displaying two screens of the display image and another image on the display unit when the number of pixels in the longitudinal direction of the segmented display image is larger than that in the lateral direction thereof; and displaying one screen of the display image on the display unit when the number of pixels in the lateral direction of the segmented display image is larger than that in the longitudinal direction thereof.

6. The display method according to claim 5, wherein the display unit is laterally long.

7. The display method according to claim 5, further comprising steps of:

similarly enlarging the display image when the two screens are displayed; and calculating a size of the other image depending on a size of the enlarged display image.

8. The display method according to claim 5, further comprising steps of:

receiving a replacement signal instructing a replacement of the screen when the two screens are displayed; and replacing a display position of the display image and the other image depending on the received replacement signal.

9. A display system comprising:

a communication device; and a display apparatus which has a display unit, wherein the communication device transmits an original image to the display apparatus, wherein the display apparatus receives information from the communication device on a segmentation position and a segmentation size, and wherein the display apparatus segments a display image from the original image received from the communication device based on the received information, judges the number of pixels in a longitudinal direction and the number of pixels in a lateral direction of the segmented display image, displays two screens of the display image and another image on the display unit when the number of pixels in the longitudinal direction of the segmented display image is larger than that in the lateral direction thereof, and displays one screen of the display image on the display unit when the number of pixels in the lateral direction of the segmented display image is larger than that in the longitudinal direction thereof.

10. A non-transitory recording medium recording a program for causing a computer to execute a processing for segmenting a display image from an original image and displaying the display image, the program causing the computer to perform steps of:

receiving information on a segmentation position and a segmentation size;

segmenting the display image from the original image based on the received information;

judging the number of pixels in a longitudinal direction and the number of pixels in a lateral direction of the segmented display image;

displaying two screens of the display image and another image on a display unit when the number of pixels in the longitudinal direction of the segmented display image is larger than that in the lateral direction thereof; and displaying one screen of the display image on the display unit when the number of pixels in the lateral direction of the segmented display image is larger than that in the longitudinal direction thereof.

\* \* \* \* \*